UNITED STATES PATENT OFFICE.

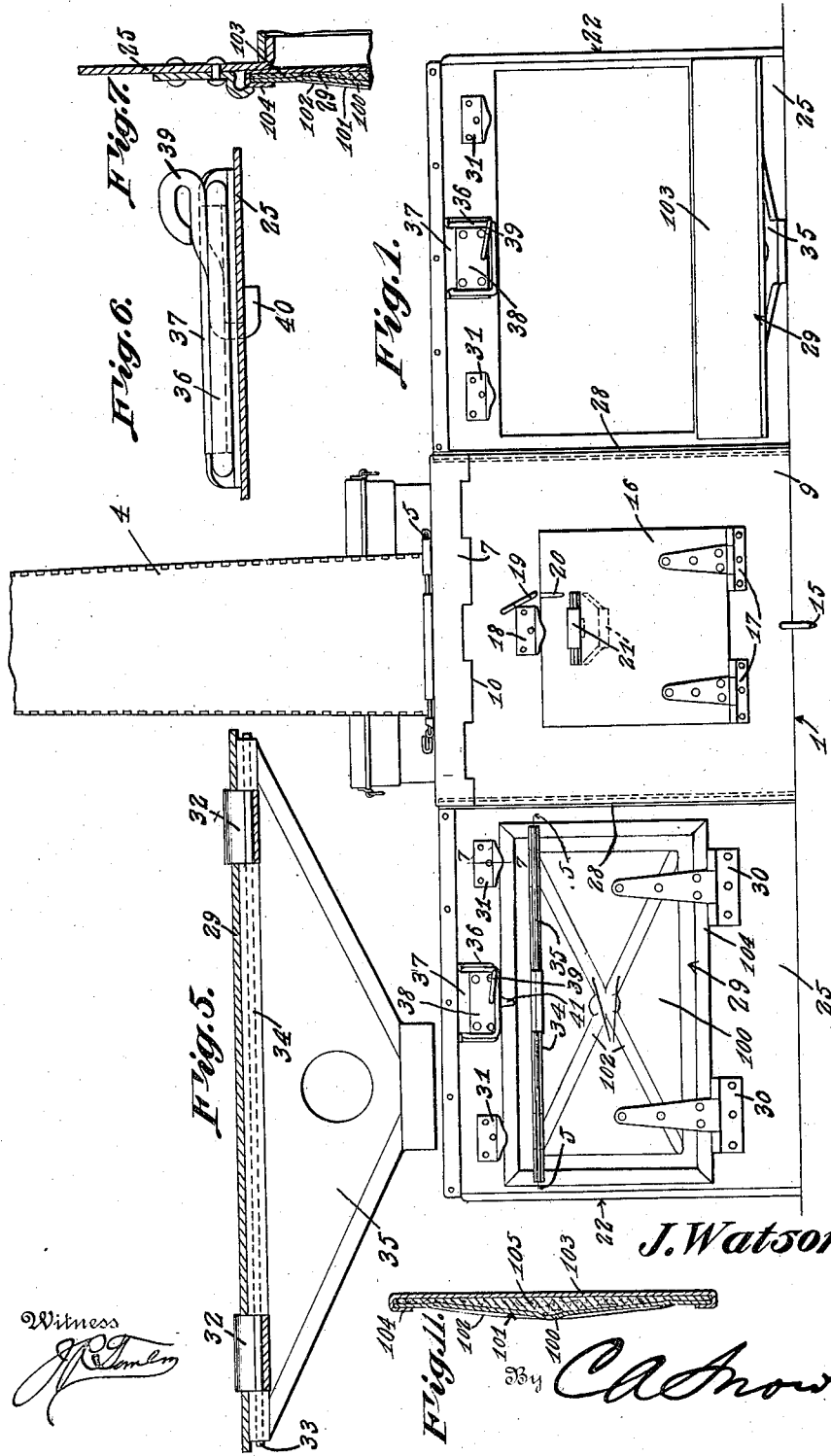

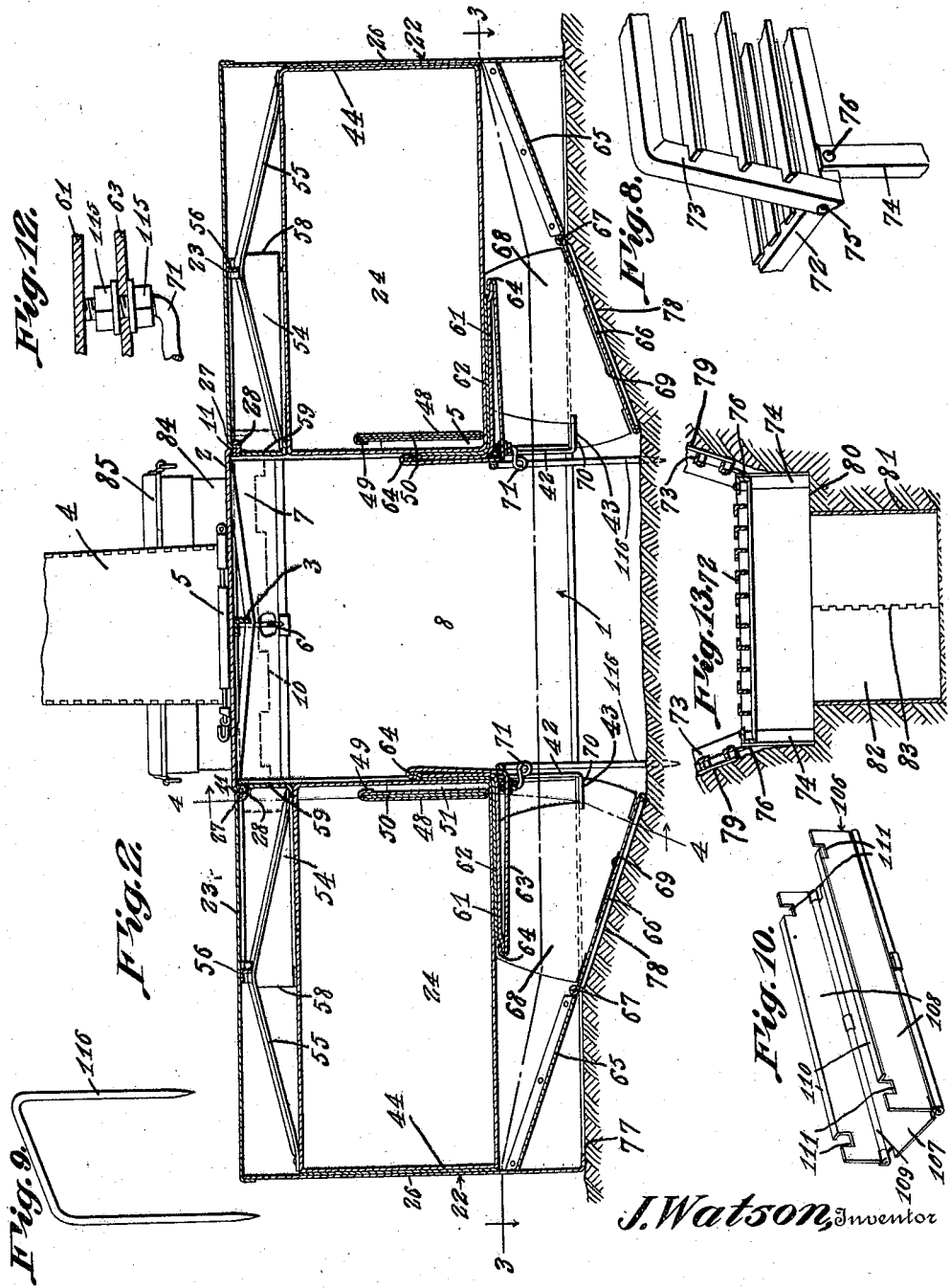

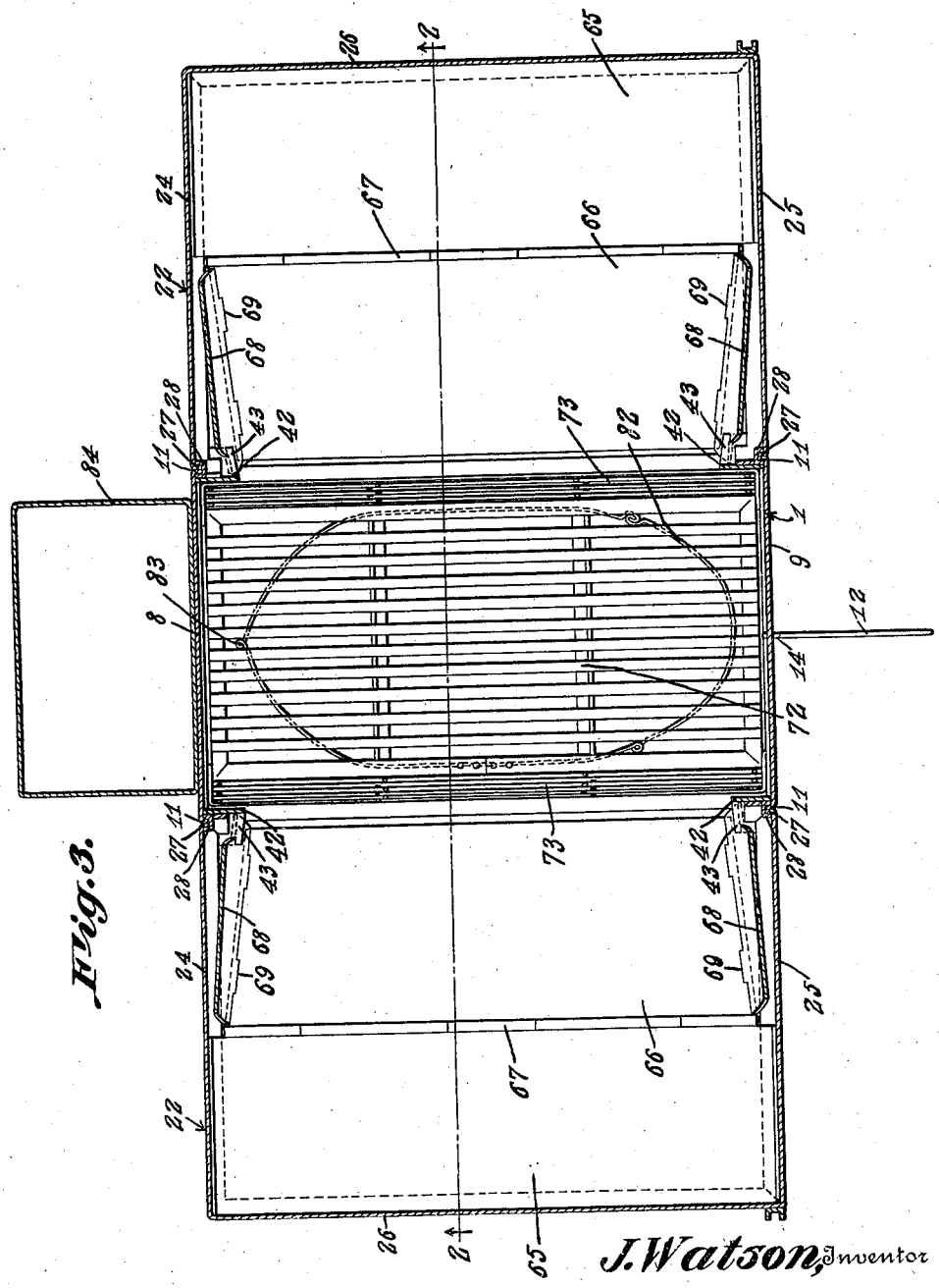

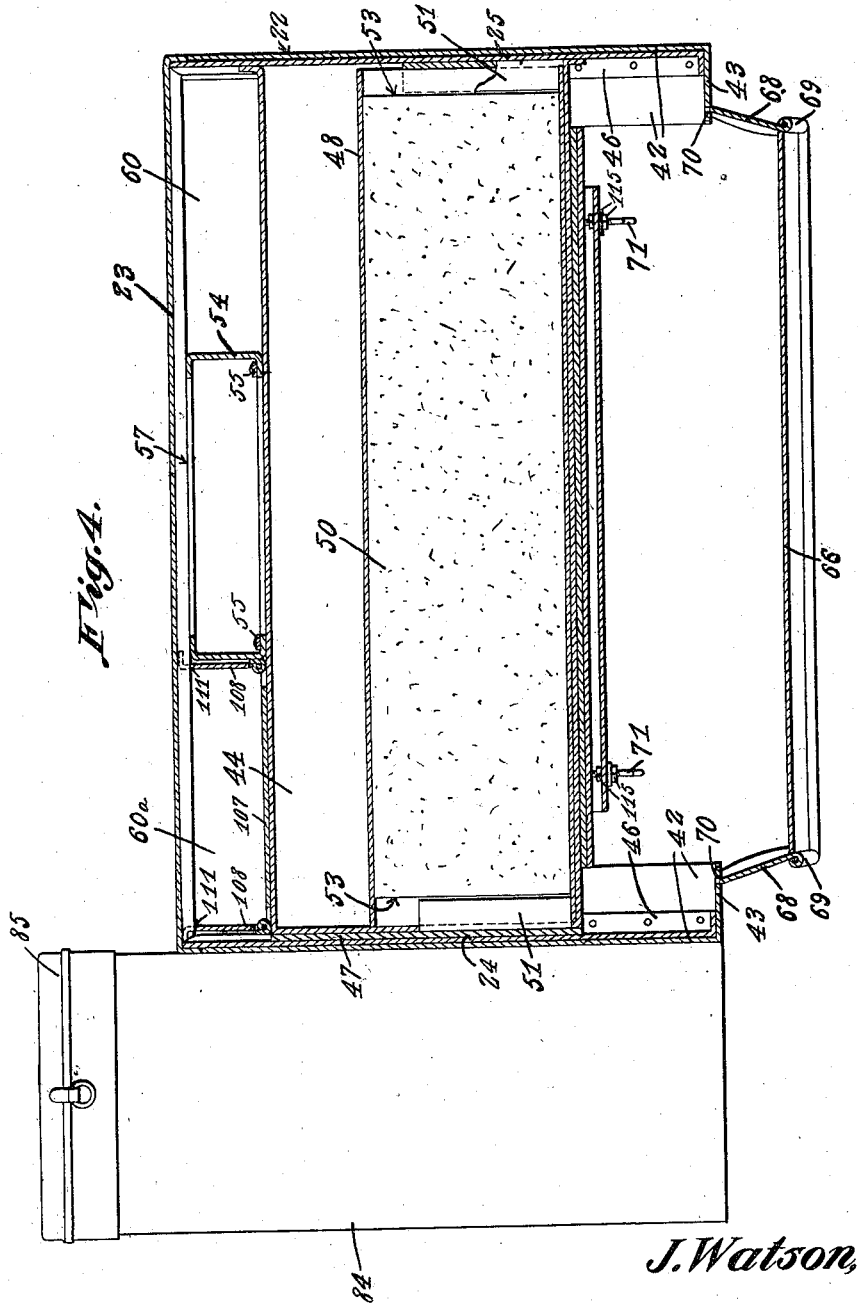

JAMES WATSON, OF MARINETTE, WISCONSIN.

FIELD-STOVE.

1,300,527. Specification of Letters Patent. Patented Apr. 15, 1919.

Application filed December 24, 1918. Serial No. 268,146.

*To all whom it may concern:*

Be it known that I, JAMES WATSON, a citizen of the United States, residing at Marinette, in the county of Marinette and State of Wisconsin, have invented a new and useful Field-Stove, of which the following is a specification.

The device forming the subject matter of this application is a stove, adapted to be used by troops in the field, by campers and others, under conditions which call for a stove capable of being collapsed readily and stored in small compass, so as to occupy but little space when the occasion for its use has passed.

The invention aims to provide novel means for connecting the central and side sections of the stove, to provide novel means for directing the products of combustion through the stove, to provide novel means whereby the fire may be held in proper relation to the stove, and to improve generally, and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in end elevation, a stove constructed in accordance with the invention, the oven door being omitted from the right-hand section; Fig. 2 is a section on the line 2—2 of Fig. 3; Fig. 3 is a horizontal section on the line 3—3 of Fig. 2; Fig. 4 is a vertical section on the line 4—4 of Fig. 2; Fig. 5 is a sectional detail showing one of the handles; Fig. 6 is a sectional detail showing one of the locking devices; Fig. 7 is a section on the line 7—7 of Fig. 1; Fig. 8 is a fragmental perspective showing a portion of the grate; Fig. 9 is a perspective disclosing one of the fuel retainers; Fig. 10 is a perspective delineating the transverse flue whereby the products of combustion are carried from above the ovens into the stack; Fig. 11 is a cross section taken through one of the doors; Fig. 12 is a fragmental sectional detail showing the mounting of one of the keepers; and Fig. 13 is a sectional detail illustrating a modified means for holding the fuel in place.

Referring to the drawings, wherein a preferred but not mandatory form of the invention is shown, the numeral 1 has been used to designate a central section including a top 2 which is suitable trussed as shown at 3. The numeral 4 marks a foldable stack attached to the top 2 of the central section 1 by any suitable means as shown at 5. The foldable stack 4 and the securing means 5 has not been shown in detail, nor will they be discussed at length, because they are not new to this application. The top 2 is supplied at its extremities with depending flanges 7. The numeral 8 denotes a rear wall, and the numeral 9 marks a front end wall, these walls being hinged as shown at 10 to the flanges 7 of the top 2 of the central section 1. The top 2, the flanges 7, and the walls 8 and 9 are provided with projecting lips 11. A rod 12 is pivoted at 14 to the front end wall 9 and carries a rectangular prong 15. The rod 12 may be used as a prop to hold the front end wall 9 in an open position when the same is swung upward and outwardly on the corresponding hinges 10. If the prong 15 on the rod 12 is embedded in the earth, then the front end wall 9 will be held in a closed position. The front end wall 9 may be supplied with a downwardly opening door 16, connected with the front wall by means of hinges 17. The upper edge of the door 16 is adapted to coact with a keeper 18 carried by the end wall 9. A latch 19 is mounted to swing on the end wall 9 and is adapted to overhang the door 16 to hold the latter firmly closed during transportation, and under other conditions which will suggest themselves to the user. The door 16 is supplied with a seat 20, wherein the free end of the latch 19 is received. When the latch 19 is not in use, it may be swung over to the left, past the vertical, and be supported on the keeper 18 as shown in Fig. 1. The door 16 carries a handle 21, which is pivotally or hingedly mounted on the door.

The stove includes a pair of side sections 22, and but one of these sections will be described, since they are alike. Each side section 22 includes a top 23, a rear end wall 24, a front end wall 25, and an outer side wall 26. The top 23, the end wall 24 and the end wall 25 are supplied with projecting lips 27 received in and secured to a channel 28 extending across the ends of the side section 22 and across the top thereof. The central section 1 may be slid downwardly, and then the lips 11 on the central section will be received in the channel 28 of the side sections 22. Thus, the central section 1 and the side sections 22 will be coupled together detachably.

The end wall 25 of the side section 22 is provided with a door 29, hingedly mounted on the end wall 25, as shown at 30, so as to swing downwardly. The upper edge of the door 29 is adapted to coöperate with keepers 31 on the end wall 25, the door being supplied with eyes 32 engaging a pivot rod 33 passing through a roll 34 formed on one edge of a plate-like handle 35, a pivotal mounting for the handle thus being provided. It is to be observed that, as shown in Fig. 5, the handle 35 is of approximately triangular form, and a firm pressure on the door 29 may be secured throughout the entire width of the door, the handle thus serving as a reinforcement for the door, to prevent buckling, and serving, also, as a means whereby an even pressure may be applied to the door throughout its width, so that the door will coöperate readily with the keepers 31. A carrying handle 36 of loop-shape is mounted in a socket 37 formed in a plate 38 secured to the end wall 25. The handle 36 forms a means whereby the side section 23 may be carried or dragged about. The door 29 swings clear of the handle 36. A latch 39 is pivoted as shown at 40 in the end wall 25 and in the plate 38 to swing parallel to these parts. The latch 39 may be turned downwardly upon the door, during transportation or otherwise, to hold the door closed, the door being supplied adjacent its upper edge with a seat 41, adapted to receive the free end of the latch 39 when the latch is so located that it will hold the door closed.

Especial attention is directed to the construction of the door 29, and, in this connection it is to be observed that the door structure hereinafter described may be used wherever expedient or necessary upon the stove. When Fig. 7 is compared with Fig. 11, it will be observed that the door 29 includes an outer plate 100 bulged as indicated at 101 and beaded at 102, in any suitable way, in order to give the outer plate the necessary strength. The door 29 comprises an inner plate 103, having a marginal flange 104, overlapped on the edge of the outer plate 100. A filler of asbestos, indicated at 105 may be located between the plates 100 and 103. The door 29, obviously, is subjected to a high degree of heat, and, consequently, to a considerable amount of expansion and contraction. The inner plate 103, which, of course, is subjected to a higher degree of heat than the outer plate 100, may expand and contract, because the flange 104 of the inner plate overlaps the edge of the outer plate 100 slidably. A buckling or distortion of the door thus is avoided, notably in view of the fact that the outer plate 100 is convexed outwardly as shown at 101, and is provided with beads 102 to afford the necessary strength, reinforcement and stiffness. Such elements as the hinges 30 and the handle 35 are attached to the outer plate 100, but not to the inner plate 103, and, as a consequence, the expansion and contraction of the inner plate remains unimpeded. A door constructed as above described will be found thoroughly efficient to withstand changes of temperature existing on its opposite sides, and will retain its shape under trying conditions, without becoming bulged, warped or otherwise distorted.

Uprights 42, of angular cross section, are secured to flanges 46 on the walls 24 and 25, the uprights having bottom flanges 43. Ovens 44 of box-like form are mounted in the side sections 22, and, preferably, are attached to the uprights 42. Asbestos may be interposed between the walls 24 and one end of the oven 44 as shown at 47. Inside the ovens, and close to the inner wall thereof is located a protector, comprising a metal strip 48 of double-walled form, the longitudinal edges of the strip being overlapped as indicated at 49, so as to inclose an asbestos filler 50. On the walls 24 and 25 are U-shaped holders 51 receiving the ends of one wall of the strip 48 to hold the same in place, the asbestos filler 50 being cut away, as shown at 53 in Fig. 4, so as to permit the U-shaped holders 51 to engage the ends of wall of the metal strip 48 wherein the asbestos filler 50 is inclosed.

A box-like casing 54 is mounted on the top of the oven 44 and is held in place by an angle iron 56 extended longitudinally of the top 23 of the side section 22 and by trusses 55 connected terminally with the top of the oven, the top 23 of the section 22 thus being sustained, and the casing 54 being held in place. The top of the casing 54 is open and is spaced as shown at 57 from the top 23 of the casing 22, the outer side of the casing being open, as indicated at 58, the inner side of the casing being closed as indicated at 59. Between the top 23 of the casing 22 and the top of the oven 44, there exists, on each side of the casing 54, spaces 60 and 60ᵃ, extended transversely of the part 22.

The invention comprises a foldable trough-shaped flue 106, shown in detail in Fig. 10.

The flue 106 comprises a bottom 107 and sides 108 hinged to the bottom as shown at 109, the sides 108 having reinforcing flanges 110, and there being notches 111 in the sides 108 at the ends of the flanges 110. The flue 106 in the condition shown in Fig. 10 is inserted at its ends into the spaces 60ª of the two side sections 22, as will be understood readily when Fig. 4 is compared with Fig. 1, the channel members 28 being received in the notches 111. A depending baffle 6 is assembled with the top 2 of the central section 1 and extends downwardly into the flue 106, to the bottom 107 thereof between the sides 8, the flanges 110 bearing against the under surface of the top 2 of the central section 1. It will now be understood that the products of combustion, rising within the central section 1, pass laterally, in opposite directions, through the spaces 60 and longitudinally of the sections 22, between the tops of the ovens and the tops 23 of the sections, the products of combustion ultimately flowing toward each other, into the flue 106, until the baffle or separator 6 is encountered, whereupon the products of combustion will find an exit through the stack 4. Since the casings 54 are spaced as shown at 57 from the tops 23 of the parts 22, the heat will pass, to some extent, above the casings 54. The general construction is such that the ovens 44 will be heated evenly, and this result is produced, in no small degree, owing to the presence of the flue 106 and the separator or baffle 6.

An angular plate 61 extends around the lower inner edge of the oven 44, and is secured thereto, an asbestos strip 62 being interposed between the plate 61 and the oven. The numeral 63 marks an angular plate provided along its longitudinal edges with hook-shaped flanges 64 engaging the longitudinal edges of the plate 61, these edges of the plate 61 being offset slightly from the oven, as shown in Fig. 2, so as to coöperate with the hook-shaped flanges 64 of the plate 63. At this point it may be stated that the plates 61 and 63, together with the protector comprising the parts 48 and 50, serve to shield the contents of the oven from being burned, it being obvious, when the description progresses, that the heat is greatest at the lower inner edge of the oven. A keeper 71, the functions of which will be mentioned hereinafter, is journaled for rotation in the plate 63, and may bear against the plate 61, as shown in Fig. 12, there being nuts 115 on the keeper 71, on opposite sides of the plate 63. The inner nut 115 may be held with a pair of pliers whereupon the keeper 61 may be removed from the plate 63, the keeper no longer bearing on the plate 61. Then, the plate may be struck upwardly and outwardly at its angle, so as to free the flanges 64 of the plate 63 from the longitudinal edges of the plate 61. In this way, the plate 63 may be renewed at any time, should it become damaged, pitted, or burned away. During the operation which consists in renewing the plate 63, the side section preferably is detached from the central section 1, and is turned upside down, so that the workmen may operate advantageously.

A fixed deflector 65 is attached to the end walls 25 and 24 and slants downwardly from the outer side wall 26 as clearly shown in Fig. 2. A movable or adjustable deflector 66 is hinged at 67 to the inner edge of each fixed deflector 65. The movable deflector 66 is supplied at its ends with upright wings 68 hinged to the movable deflector at 69. In the edges of the wings 68, notches 70 are formed, the notches being adapted to engage the flanges 43 on the lower edges of the uprights 42. The keeper 71, hereinbefore mentioned, coöperates with the inner edge of the deflector 66, under conditions, and for a purpose, which will be set forth hereinafter.

In practical operation, the side sections are supported on the surface 77 of the ground, the central section 1 being carried by the side sections, in the way hereinbefore described. The movable deflector 66 is disposed in alinement with the fixed deflector 65, and the surface of the ground may be inclined, as indicated at 78, to receive the movable deflector. The wings 68 upstand, and the notches 70 are engaged with the parts 43 on the lower ends of the uprights 42, the wings 42 thus being held in upright positions to prevent the earth from sliding inwardly and interfering with the fire or with the products of combustion as they pass upwardly along the deflectors 66 and 65. Staple-shaped retainers 116 may be thrust into the ground, in alinement with the inner walls of the ovens 44, to hold the fuel in place, within the central section, the movements of the products of combustion with respect to the ovens 44 having been traced out hereinbefore.

The invention includes a grate, comprising a bottom 72, sides 73 and legs 74. The sides 73 are pivoted at 75 to the bottom 72, and the legs 74 are pivoted to the bottom as shown at 76. If desired, the soil may be inclined or dug away as indicated at 79, to receive the sides 73 of the grate, a platform 80, cut into the soil, serving to support the legs 74, the grate, in this way, being held in the position shown in Fig. 13. In the platform 80, an opening is dug, and in this opening 81 is disposed a tubular ash pit 82, the outline of which has been indicated in Fig. 3. The ash pit 82 preferably is made of sheet metal and includes any desired number of sections detachably connected as shown at 83. When the ash pit 82 is in the ground, the pit is of tubular construction, but it is possible to collapse the pit and pack it away.

A water tank 84 is disposed against the end wall 8 of the central section 1, the water tank including a lid 85.

Although the grate may be omitted as shown in Fig. 2, it may be used when desired, as shown in Fig. 13, and when the grate is employed, the ashes falling through the grate, will be received in the pit 82. The fuel, preferably is stoked through the door 16, or into the end of the central section 1 if the wall 9 is raised and propped up by the rod 12. Access is had to the ovens 44 by way of the doors 29.

The structure shown set up in Fig. 1 of the drawings may be collapsed and packed away so as to occupy but little space. Thus, the water tank 84 may be slid into one of the ovens 44. The central section 1 may be detached from the side sections 22, and the ends 8 and 9 of the central section may be folded with respect to the top 2 of the central section. Similarly, the stack 4 may be detached from the top 2 of the central section, and be folded. When the stack is folded, it may be placed between one of the fixed deflectors 65 and the bottom of the corresponding oven 44. The flue 106 may be folded and stored away in a similar way. The movable deflector 66 may be swung upwardly and be engaged by the keeper 71 when the latter is rotated, and, thus, the stack 44 the flue 106 or any other desired articles may be held in place against the bottoms of the ovens 44 by the deflectors 65 and 66. The ash pit 82 may be collapsed and be stored away in any convenient or accessible place. The particular way in which the parts are housed when the structure is knocked down will be understood readily by those skilled in the art, and will be dictated to some extent, by the operation which the user wishes to follow. When the stove is in a collapsed form, it consists, essentially, of but three parts, to wit, the folded side sections 22 and the folded central section 1.

Having thus described the invention, what is claimed is:—

1. In a device of the class described, a central section including a top having an outlet for the products of combustion; side sections detachably connected with the central section and having tops; ovens in the side sections; casings disposed between the ovens and the tops of the side sections and extending part way across the side sections transversely, there being front and rear passages at the ends of the sections, on opposite sides of the casings; and an inverted collapsible trough-shaped flue having its ends inserted into the rear passages, the flue coöperating with the top of the central section and communicating with the outlet.

2. In a device of the class described, a central section including a top; a stack carried by the top; side sections detachably connected with the central section and having tops; ovens in the side sections; casings disposed between the ovens and the tops of the side sections and extending part way across the side sections transversely, there being front and rear passages at the ends of the sections, on opposite sides of the casings; an inverted collapsible trough-shaped flue having its ends inserted into the rear passages, the flue coöperating with the top of the central section and communicating with the stack; and a depending separator carried by the top of the central section in alinement with the stack and extending downwardly into the inverted trough-shaped flue.

3. In a device of the class described, a central section having an outlet for the products of combustion; side sections detachably connected to the central section; ovens in the side sections; downwardly and inwardly inclined deflectors connected to the side sections and located below the ovens; movable deflectors hinged to the inner edges of the first specified deflectors; and keepers on the side sections, the keepers coacting with the inner free edges of the movable deflectors, when the movable deflectors are swung upwardly.

4. In a device of the class described, a central section having an outlet for the products of combustion; side sections detachably connected to the central section; ovens in the side sections; fixed deflectors carried by the side sections and located below the ovens, the fixed deflectors slanting downwardly and inwardly; movable deflectors hinged to the inner edges of the fixed deflectors; and upright wings hinged to the ends of the movable deflectors.

5. In a device of the class described, a central section having an outlet for the products of combustion; side sections detachably connected with the central section; ovens in the side sections; fixed deflectors located below the ovens and connected with the side sections, the fixed deflectors slanting downwardly and inwardly; movable deflectors hinged to the inner edges of the fixed deflectors; wings hinged to the ends of the movable deflectors; and interengaging elements on the side sections and on the wings, for holding the wings in upright positions.

6. In a device of the class described, a central section having an outlet for the products of combustion; side sections detachably connected with the central section; ovens in the side sections; angular plates secured exteriorly to the ovens, about the lower inner edges thereof, the plates having their longitudinal edges offset from the ovens; second plates of angular form, having hook-shaped flanges engaging with the outset edges of the first plates; and protectors in the ovens adjacent to the inner edges of the ovens, the protectors being vertically disposed.

In testimony that I claim the foregoing as my own, I have hereto affixed my signature in the presence of two witnesses.

JAMES WATSON.

Witnesses:
O. G. PINKOWSKY,
HATTIE THORESON.